United States Patent
Ciacci

[19]

[11] Patent Number: 5,984,405
[45] Date of Patent: Nov. 16, 1999

[54] VEHICLE SCREEN

[76] Inventor: Michael G. Ciacci, 11540 Westminster Hwy, Richmond British Columbia, Canada, V6X 1B3

[21] Appl. No.: 08/997,970

[22] Filed: Dec. 24, 1997

[51] Int. Cl.[6] ....................................................... B60J 7/11
[52] U.S. Cl. .......................... 296/218; 296/217; 296/219; 160/354
[58] Field of Search .................. 160/DIG. 2, DIG. 6, 160/368.1, 370.21, 370.22, 354, DIG. 4; 296/216.01, 152, 218, 95.1

[56] References Cited

U.S. PATENT DOCUMENTS

| D. 360,181 | 7/1995 | Brooks | D12/401 |
|---|---|---|---|
| 2,595,833 | 5/1952 | Flaherty | 160/354 X |
| 2,717,036 | 9/1955 | Harris | 160/368.1 X |
| 3,016,952 | 1/1962 | Shero | 160/354 |
| 3,263,736 | 8/1966 | Macomson | 296/95.1 X |
| 3,670,798 | 6/1972 | Hess et al. | 160/354 |
| 3,679,505 | 7/1972 | Hinderaker et al. | 160/354 X |
| 3,805,872 | 4/1974 | Lorber | 160/354 |
| 4,395,939 | 8/1983 | Hough et al. | 296/216.02 X |
| 4,702,518 | 10/1987 | Paerisch et al. | 296/217 |
| 4,802,523 | 2/1989 | Scholten et al. | 160/354 |
| 4,872,722 | 10/1989 | Farmont | 296/216.01 X |
| 4,993,471 | 2/1991 | Golden | 160/370.21 |
| 5,040,839 | 8/1991 | Moore | 296/97.4 |
| 5,364,156 | 11/1994 | Zerow | 296/95.1 X |

FOREIGN PATENT DOCUMENTS

| 2235233 | 2/1991 | United Kingdom | 160/DIG. 2 |
|---|---|---|---|

*Primary Examiner*—D. Glenn Dayoan
*Assistant Examiner*—Chad D Wells

[57] ABSTRACT

A new vehicle screen for attaching to the exterior roof of a vehicle to cover an open roof opening. The inventive device includes a generally rectangular flexible mesh screen having a plurality of spaces therethrough. A flexible border member is extended around the outer periphery of the mesh screen. The lower surface of the border member is designed for detachably mounting on the exterior roof of a vehicle around the periphery of a roof opening through the roof of the vehicle. Provided on the lower surface is a magnetic strip which is designed for magnetically mounting the lower surface of the border member to the exterior roof of a vehicle. Provided on the upper surface of the border member is an elongate attachment strip. The attachment strip is designed for attaching to a wind shield device upwardly extending from the exterior roof of a vehicle adjacent the roof opening. The border member and the mesh screen, along with the strips are all sufficiently flexible to permit rolling up of the border member and the mesh screen into a generally cylindrical roll.

7 Claims, 3 Drawing Sheets

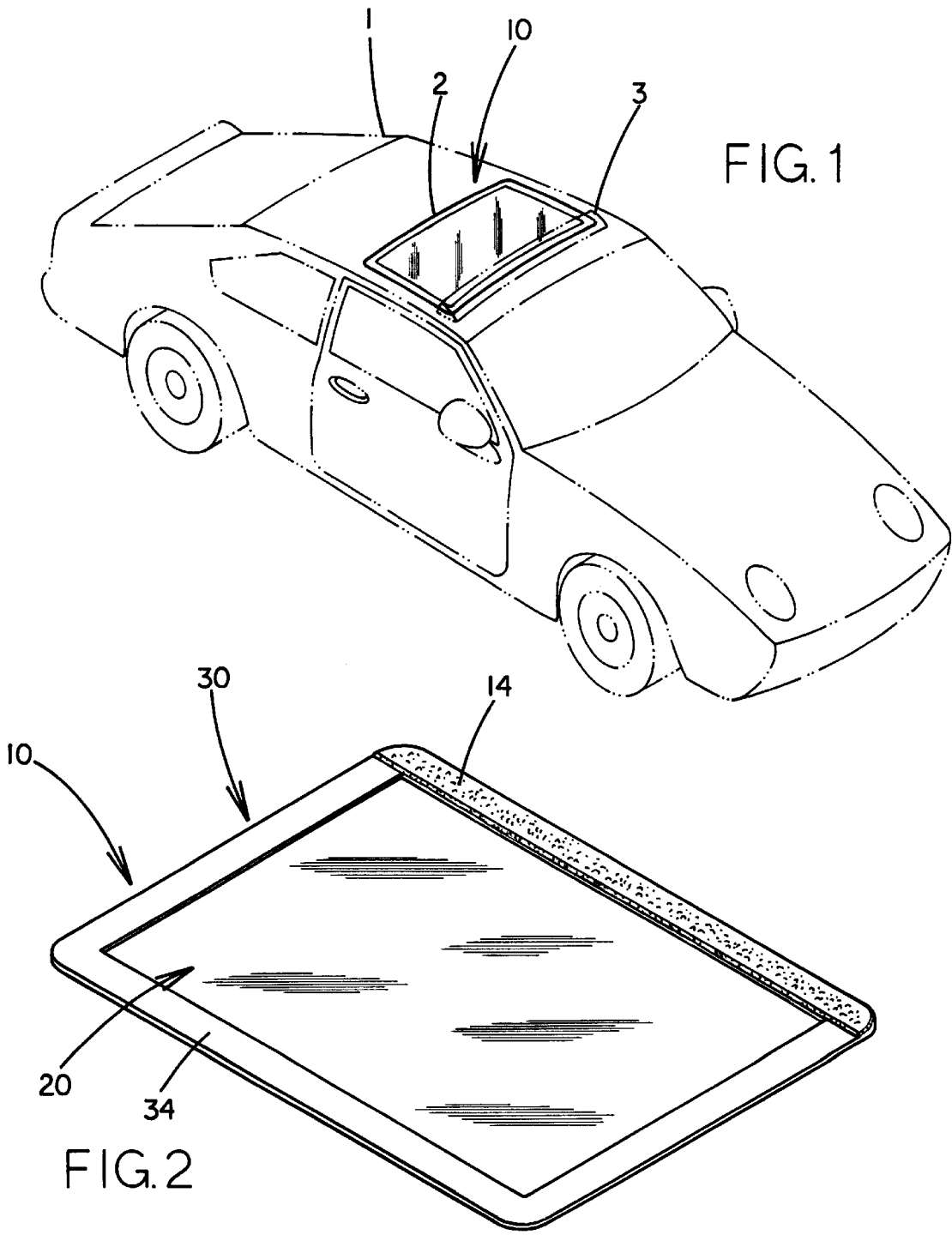

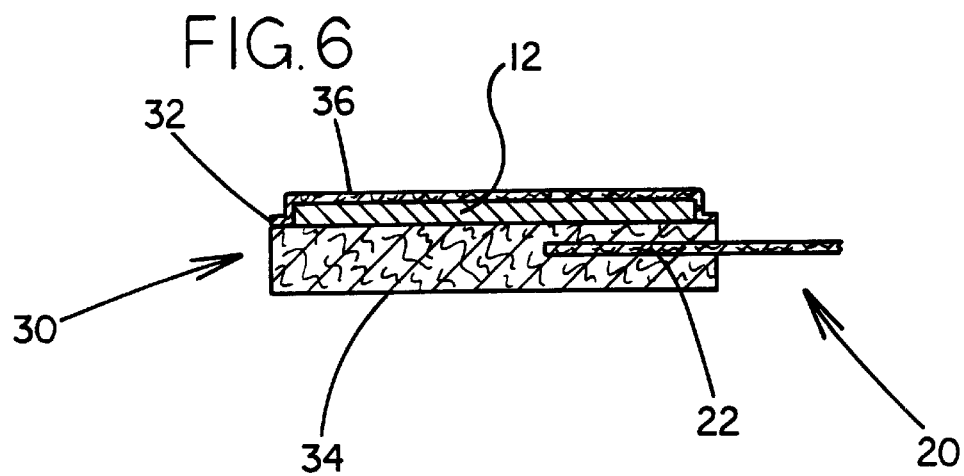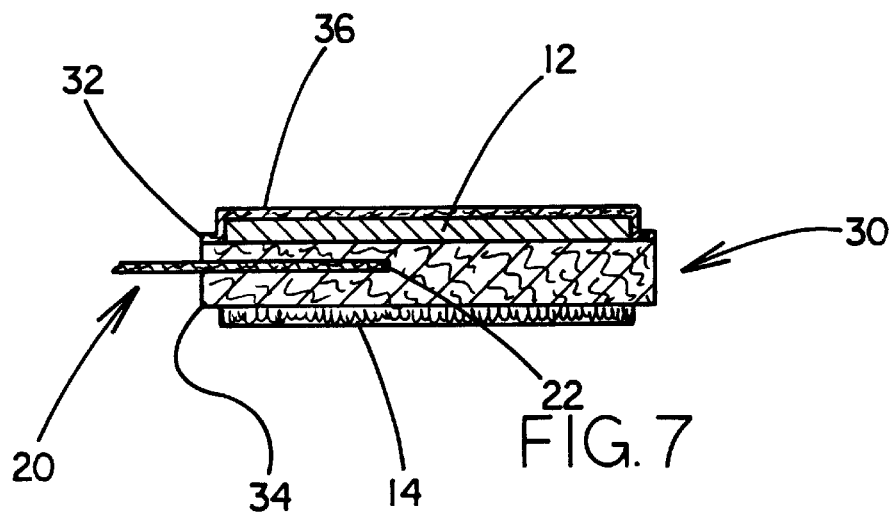

VEHICLE SCREEN

BACKGROUND OF THE INVENTION

1. Field of the Invention

The present invention relates to vehicle screens and more particularly pertains to a new vehicle screen for attaching to the exterior roof of a vehicle to cover an open roof opening, such as a sun roof.

2. Description of the Prior Art

The use of vehicle screens is known in the prior art. More specifically, vehicle screens heretofore devised and utilized are known to consist basically of familiar, expected and obvious structural configurations, notwithstanding the myriad of designs encompassed by the crowded prior art which have been developed for the fulfillment of countless objectives and requirements.

Known prior art vehicle screens include U.S. Pat. Nos. 4,993,471; 5,040,839; 360,181; 4,395,939; 4,872,722; and 4,702,518.

While these devices fulfill their respective, particular objectives and requirements, the aforementioned patents do not disclose a new vehicle screen. The inventive device includes a generally rectangular flexible mesh screen having a plurality of spaces therethrough. A flexible border member is extended around the outer periphery of the mesh screen. The lower surface of the border member is designed for detachably mounting on the exterior roof of a vehicle around the periphery of a roof opening through the roof of the vehicle. Provided on the lower surface is a magnetic strip which is designed for magnetically mounting the lower surface of the border member to the exterior roof of a vehicle. Provided on the upper surface of the border member is an elongate attachment strip. The attachment strip is designed for attaching to a wind shield device upwardly extending from the exterior roof of a vehicle adjacent the roof opening. The border member and the mesh screen, along with the strips are all sufficiently flexible to permit rolling up of the border member and the mesh screen into a generally cylindrical roll.

In these respects, the vehicle screen according to the present invention substantially departs from the conventional concepts and designs of the prior art, and in so doing provides an apparatus primarily developed for the purpose of attaching to the exterior roof of a vehicle to cover an open roof opening, such as a sun roof.

SUMMARY OF THE INVENTION

In view of the foregoing disadvantages inherent in the known types of vehicle screens now present in the prior art, the present invention provides a new vehicle screen construction wherein the same can be utilized for attaching to the exterior roof of a vehicle to cover an open roof opening, such as a sun roof.

The general purpose of the present invention, which will be described subsequently in greater detail, is to provide a new vehicle screen apparatus and method which has many of the advantages of the vehicle screens mentioned heretofore and many novel features that result in a new vehicle screen which is not anticipated, rendered obvious, suggested, or even implied by any of the prior art vehicle screens, either alone or in any combination thereof.

To attain this, the present invention generally comprises a generally rectangular flexible mesh screen having a plurality of spaces therethrough. A flexible border member is extended around the outer periphery of the mesh screen. The lower surface of the border member is designed for detachably mounting on the exterior roof of a vehicle around the periphery of a roof opening through the roof of the vehicle. Provided on the lower surface is a magnetic strip which is designed for magnetically mounting the lower surface of the border member to the exterior roof of a vehicle. Provided on the upper surface of the border member is an elongate attachment strip. The attachment strip is designed for attaching to a wind shield device upwardly extending from the exterior roof of a vehicle adjacent the roof opening. The border member and the mesh screen, along with the strips are all sufficiently flexible to permit rolling up of the border member and the mesh screen into a generally cylindrical roll.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new vehicle screen apparatus and method which has many of the advantages of the vehicle screens mentioned heretofore and many novel features that result in a new vehicle screen which is not anticipated, rendered obvious, suggested, or even implied by any of the prior art vehicle screens, either alone or in any combination thereof.

It is another object of the present invention to provide a new vehicle screen which may be easily and efficiently manufactured and marketed.

It is a further object of the present invention to provide a new vehicle screen which is of a durable and reliable construction.

An even further object of the present invention is to provide a new vehicle screen which is susceptible of a low cost of manufacture with regard to both materials and labor, and which accordingly is then susceptible of low prices of sale to the consuming public, thereby making such vehicle screen economically available to the buying public.

Still yet another object of the present invention is to provide a new vehicle screen which provides in the apparatuses and methods of the prior art some of the advantages thereof, while simultaneously overcoming some of the disadvantages normally associated therewith.

Still another object of the present invention is to provide a new vehicle screen for attaching to the exterior roof of a vehicle to cover an open roof opening, such as a sun roof.

Yet another object of the present invention is to provide a new vehicle screen which includes a generally rectangular flexible mesh screen having a plurality of spaces therethrough. A flexible border member is extended around the outer periphery of the mesh screen. The lower surface of the border member is designed for detachably mounting on the exterior roof of a vehicle around the periphery of a roof opening through the roof of the vehicle. Provided on the lower surface is a magnetic strip which is designed for magnetically mounting the lower surface of the border member to the exterior roof of a vehicle. Provided on the upper surface of the border member is an elongate attachment strip. The attachment strip is designed for attaching to a wind shield device upwardly extending from the exterior roof of a vehicle adjacent the roof opening. The border member and the mesh screen, along with the strips are all sufficiently flexible to permit rolling up of the border member and the mesh screen into a generally cylindrical roll.

Still yet another object of the present invention is to provide a new vehicle screen that is detachably mountable to the roof of a vehicle having a commonly found wind shield device covering the front of the roof opening.

Even still another object of the present invention is to provide a new vehicle screen that keeps insects, leaves, and other falling debris from entering the interior of a vehicle through an open roof opening, such as a sun roof.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a schematic perspective view of a new vehicle screen mounted on the roof of a vehicle to cover a roof opening according to the present invention.

FIG. 2 is a schematic perspective top side view of the present invention.

FIG. 6 is a schematic cross sectional view of the present invention of an optional embodiment of the invention having a sleeve on the lower surface of the border member.

FIG. 7 is a schematic cross sectional view of the present invention taken of an optional embodiment of the invention having a sleeve on the lower surface of the border member.

DESCRIPTION OF THE PREFERRED EMBODIMENT

Figure 3:
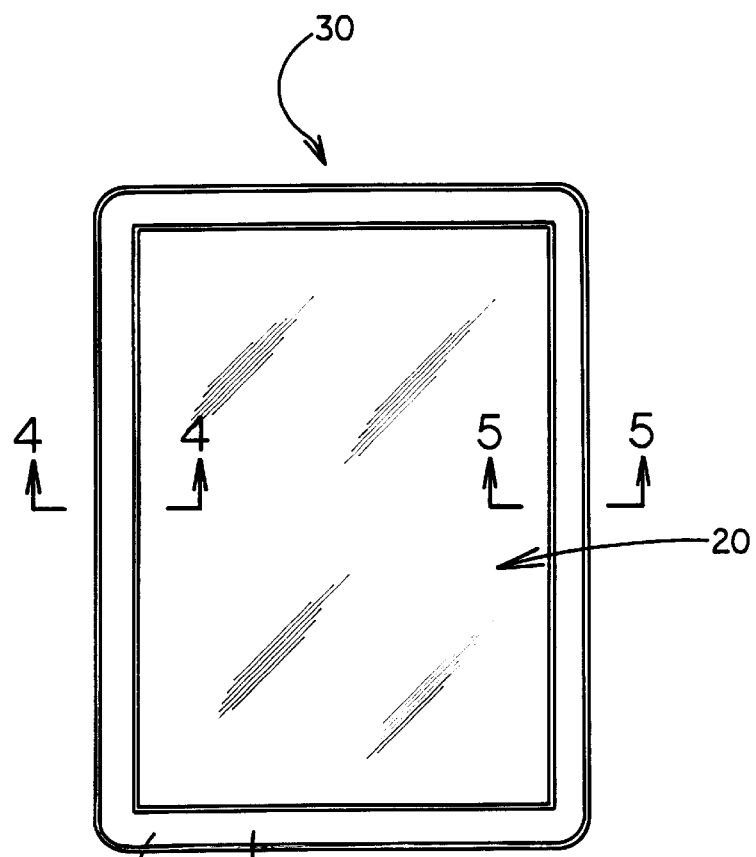
FIG. 3 is a schematic bottom side view of the present invention.
Figure 4:
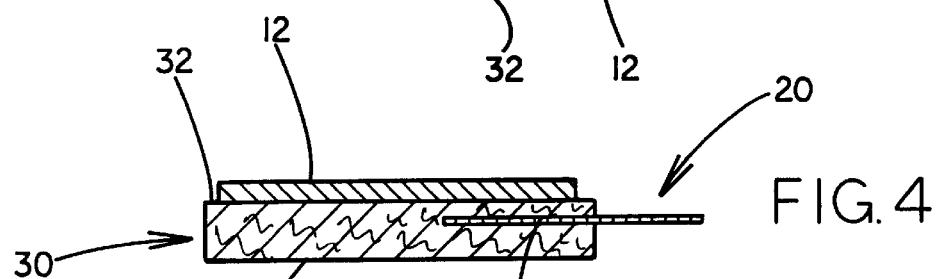
FIG. 4 is a schematic cross sectional view of the present invention taken from line 4—4 on FIG. 3.

With reference now to the drawings, and in particular to FIGS. 1 through 7 thereof, a new vehicle screen embodying the principles and concepts of the present invention and generally designated by the reference numeral 10 will be described.

In use, the vehicle screen 10 is designed for covering a roof opening 2 of a vehicle 1. As best illustrated in FIGS. 1 through 7, the vehicle screen 10 generally comprises a generally rectangular flexible mesh screen 20 having a plurality of spaces (not shown) therethrough. A flexible border member 30 is extended around the outer periphery 22 of the mesh screen 20. The lower surface 32 of the border member 30 is designed for detachably mounting on the exterior roof of a vehicle 1 around the periphery of a roof opening 2 through the roof of the vehicle 1. Provided on the lower surface 32 is a magnetic strip 12 which is designed for magnetically mounting the lower surface 32 of the border member 30 to the exterior roof of a vehicle 1. Provided on the upper surface 34 of the border member 30 is an elongate attachment strip 14. The attachment strip is designed for attaching to a wind shield device 3 upwardly extending from the exterior roof of a vehicle 1 adjacent the roof opening 2. The border member 20 and the mesh screen 30, along with the strips 12,14, are all sufficiently flexible to permit rolling up of the border member 20 and the mesh screen 30 into a generally cylindrical roll (not shown).

The flexible mesh screen 20 has a plurality of spaces therethrough and is generally rectangular to conform to a roof opening 2 of a vehicle 1. When mounted to a vehicle, the mesh screen 20 helps prevent insects, leaves and other falling debris from passing through the roof opening 2 into the interior of the vehicle 1.

The flexible border member 30 is extended around the outer periphery 22 of the mesh screen 20. The border member 30 is generally rectangular in shape and has four elongate sides. Ideally, the border member is made of a fabric, such as nylon. The lower surface 32 of the border member 30 is designed for detachably mounting on the exterior roof of a vehicle 1 around the periphery of a roof opening 2 through the roof of the vehicle 1. A flexible magnetic strip 12 is provided on the lower surface 32 and substantially extends around the outer perimeter 22 of the mesh screen 20. The magnetic strip 12 permits magnetic mounting of the lower surface 32 of the border member 30 to the exterior roof of a vehicle 1.

Figure 5:
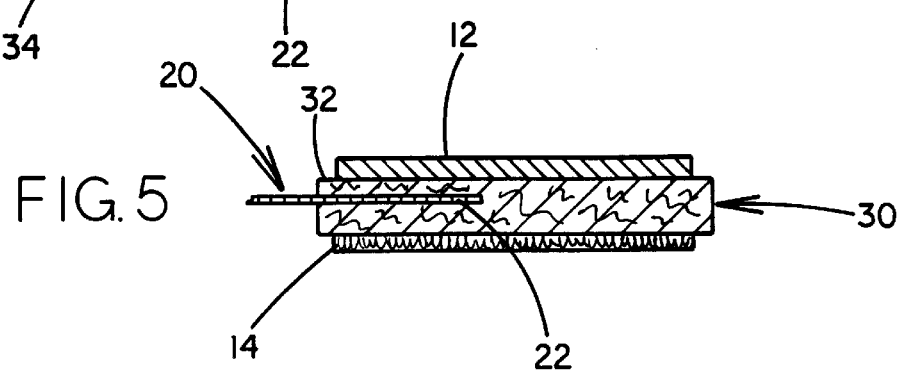
FIG. 5 is a schematic cross sectional view of the present invention taken from line 5—5 on FIG. 3.

Provided on the upper surface 34 of the border member 30 is an elongate attachment strip 14 along one of the sides of the border member 30. Preferably, as illustrated in FIG. 2, the attachment strip 14 is extended along one of the longer sides of the border member 30. The attachment strip 14 is designed for attaching to the underside of a wind shield device 3 upwardly extending from the exterior roof of a vehicle 1 adjacent a roof opening 2 through the roof of the vehicle 1. Preferably, as shown in FIG. 5, the attachment strip 14 comprises one portion of a hook and loop fastener that is attachable to another complementary portion of a hook and loop fastener attached to the underside of a wind shield device 3 on the roof of a vehicle 1.

In use, the border member 30 and the mesh screen 20 are sufficiently flexible to permit their being rolled up into a generally cylindrical roll for convenient storage when the screen device 10 is not in use mounted to the roof of a vehicle.

Optionally, as shown in FIGS. 6 and 7, the lower surface 32 of the border member 30 includes a sleeve 36 substantially extending around the outer perimeter 22 of the mesh screen 20. The sleeve defines a channel into which the magnetic strip 12 may be disposed. Preferably, the sleeve 36 has an opening (not shown) into the channel which permits re-insertable removal of the magnetic strip 12 from the channel formed by the sleeve 36.

In use, the vehicle screen 10 is positioned on the roof of a vehicle 1 so that the mesh screen 20 covers the roof opening 2 and the lower surface 32 of the border member 30 faces the roof. The magnetic strip 12 attaches the device 10 to around the periphery of the roof opening 2. The attachment strip 14 may be used to attach the upper surface 34 of the border member 30 to the wind screen device 3 often found covering the front of a roof opening 2.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A vehicular roof opening screening system, comprising:
    a vehicle having a roof, said roof of said vehicle having a roof opening, said roof opening having an outer perimeter;
    a wind shield device being coupled to said roof and extending adjacently along a portion of said outer perimeter of said roof opening;
    a flexible mesh screen substantially covering said roof opening of said vehicle, said mesh screen having a plurality of spaces therethrough, said mesh screen having an outer periphery;
    a flexible border member being extended around said outer periphery of said mesh screen, said border member having a first surface and a second surface;
    a flexible magnetic strip being provided on said second surface of said border member, said magnetic strip magnetically mounting said second surface of said border member to said roof of said vehicle around said outer perimeter of said roof opening;
    an elongate flexible attachment strip being provided on said first surface of said border member, said attachment strip being attached to the wind shield device; and
    wherein said border member and said mesh screen are flexible to permit rolling up of said border member and said mesh screen into a generally cylindrical roll upon detachment from said roof.

2. The vehicular roof opening screening system of claim 1, wherein said magnetic strip is substantially extended around said outer periphery of said mesh screen.

3. The vehicular roof opening screening system of claim 1, wherein said attachment strip comprises one portion of a hook and loop fastener, said portion of a hook and loop fastener being attachable to another complementary portion of a hook and loop fastener attached to the wind shield on the roof of the vehicle.

4. The vehicular roof opening screening system of claim 3, wherein said border member is generally rectangular and has four elongate sides, wherein said elongate attachment strip is provided on said first surface of said border member along one of said sides of said border member.

5. The vehicular roof opening screening system of claim 1, wherein, said second surface of said border member has a sleeve thereon being substantially extended around said outer perimeter of said mesh screen, said sleeve defining a channel, said magnetic strip being disposed within said channel.

6. A screen device for covering a roof opening of a vehicle, said screen device comprising:
    a flexible mesh screen having a plurality of spaces therethrough, said mesh screen being generally rectangular and having an outer periphery;
    a flexible border member being extended around said outer periphery of said mesh screen, said border member being generally rectangular and having four elongate sides, said border member having a first surface and a second surface, said second surface being for detachably mounting on an exterior roof of the vehicle around the periphery of a roof opening through the roof of the vehicle;
    a flexible magnetic strip being provided on said second surface of said border member, said magnetic strip being substantially extended around said outer periphery of said mesh screen, said magnetic strip being for magnetically coupling said second surface of said border member to the exterior roof of the vehicle;
    an elongate flexible attachment strip being provided on said first surface of said border member along one of said sides of said border member, said attachment strip being for attaching to a wind shield device upwardly extending from the exterior roof of the vehicle adjacent the roof opening through the roof of the vehicle, said attachment strip comprising one portion of a hook and loop fastener, said portion of a hook and loop fastener being attachable to another complementary portion of a hook and loop fastener attached to the wind shield device on the roof of the vehicle; and
    wherein said border member and said mesh screen are flexible to permit rolling up of said border member and said mesh screen into a generally cylindrical roll.

7. A vehicular roof opening screening system, comprising:
    a vehicle having a roof, said roof of said vehicle having a roof opening;
    said roof opening having a generally rectangular outer perimeter comprising a front edge, a back edge and a pair of side edges, said front edge of said roof opening being positioned towards a front end of said vehicle;
    a wind shield device being coupled to said roof and extending adjacently along said front edge of said roof opening;
    a flexible mesh screen substantially covering said roof opening of said vehicle, said mesh screen having a plurality of spaces therethrough, said mesh screen having a generally rectangular outer periphery;

a flexible border member being extended around said outer periphery of said mesh screen, said border member being generally rectangular and having four elongate sides, said border member having a first surface and a second surface;

said border member being extended around said outer perimeter of said roof opening, each of said elongate sides of said border member being extended substantially parallel to an associated edge of said outer perimeter of said roof opening;

a flexible magnetic strip being provided on said second surface of said border member, said magnetic strip being substantially extended around said outer periphery of said mesh screen, said magnetic strip magnetically coupling said second surface of said border member to said roof of said vehicle adjacently around said outer perimeter of said roof opening; wherein said second surface of said border member has a sleeve thereon being substantially extended around said outer perimeter of said mesh screen, said sleeve defining a channel, said magnetic strip being disposed in said channel;

an elongate flexible attachment strip being provided on said first surface of said border member along one of said sides of said border member extending adjacent said front edge of said roof opening, said attachment strip being attached to said wind shield device, said attachment strip comprising one portion of a hook and loop fastener, said portion of a hook and loop fastener being attached to another complementary portion of a hook and loop fastener attached to said wind shield device; and wherein said border member and said mesh screen are flexible to permit rolling up of said border member and said mesh screen into a generally cylindrical roll upon detachment from said roof.

\* \* \* \* \*